(12) United States Patent
Sadler

(10) Patent No.: US 8,800,701 B1
(45) Date of Patent: Aug. 12, 2014

(54) ELECTRIC VEHICLE WITH ONBOARD ELECTRICITY PRODUCTION

(75) Inventor: Lawrence Sadler, Palmetto, FL (US)

(73) Assignee: L.R.S. Innovations, Inc., Palmetto, FL (US)

( * ) Notice: Subject to any disclaimer, the term of this patent is extended or adjusted under 35 U.S.C. 154(b) by 633 days.

(21) Appl. No.: 12/590,072

(22) Filed: Nov. 2, 2009

(51) Int. Cl.
*B60K 1/00* (2006.01)

(52) U.S. Cl.
USPC .................................. 180/65.31; 180/65.29

(58) Field of Classification Search
USPC ................... 180/65.21, 65.22, 65.245, 65.31
See application file for complete search history.

(56) References Cited

U.S. PATENT DOCUMENTS

| | | | | |
|---|---|---|---|---|
| 3,517,766 | A | * | 6/1970 | West ........................ 180/65.245 |
| 4,199,037 | A | * | 4/1980 | White ....................... 180/65.245 |
| 4,307,325 | A | | 12/1981 | Saar |
| 4,317,176 | A | | 2/1982 | Saar et al. |
| 4,412,158 | A | | 10/1983 | Jefferson et al. |
| 4,503,370 | A | | 3/1985 | Cuneo |
| 4,905,579 | A | | 3/1990 | Dame |
| 5,214,358 | A | * | 5/1993 | Marshall ....................... 318/139 |
| 5,345,761 | A | * | 9/1994 | King et al. ...................... 60/274 |
| 5,406,126 | A | * | 4/1995 | Hadley et al. ................... 290/45 |
| 5,498,950 | A | | 3/1996 | Ouwerkerk |
| 5,563,482 | A | | 10/1996 | Shaw et al. |
| 5,650,713 | A | * | 7/1997 | Takeuchi et al. ................ 322/16 |
| 5,754,019 | A | | 5/1998 | Walz |
| 5,778,997 | A | * | 7/1998 | Setaka et al. ............. 180/65.245 |
| 5,786,640 | A | * | 7/1998 | Sakai et al. ...................... 290/17 |
| 5,798,584 | A | | 8/1998 | Schaeffeler et al. |
| 5,848,659 | A | * | 12/1998 | Karg et al. ................ 180/65.245 |
| 5,969,624 | A | * | 10/1999 | Sakai et al. ................. 340/636.1 |
| 6,018,694 | A | * | 1/2000 | Egami et al. .................... 701/102 |
| 6,105,697 | A | * | 8/2000 | Weaver ..................... 180/65.245 |
| 6,326,765 | B1 | * | 12/2001 | Hughes et al. ................. 320/104 |
| 6,346,794 | B1 | | 2/2002 | Odaohhara |
| 6,481,516 | B1 | * | 11/2002 | Field et al. ................. 180/65.23 |
| 6,583,603 | B1 | | 6/2003 | Baldwin |

(Continued)

FOREIGN PATENT DOCUMENTS

| | | |
|---|---|---|
| JP | 08289407 | 11/1996 |
| JP | 2000014031 | 1/2000 |

(Continued)

OTHER PUBLICATIONS

PCT/US2012/044091 International Search Report and Written Opinion, Dec. 28, 2012.

(Continued)

*Primary Examiner* — Katy M Ebner
(74) *Attorney, Agent, or Firm* — Kunzler Law Group

(57) ABSTRACT

An internal combustion engine, an electricity production unit, batteries and an electric motor combine to provide for an extremely high mileage vehicle which has an extremely long driving range between the vehicle requiring re-fueling. Because the vehicle utilizes petroleum based fuel to power the internal combustion engine the vehicle can be fueled at any location which commercially provides petroleum fuels to the public. The electricity production unit electricity output while being powered by a very low horsepower internal combustion engine. Amplification of amperage and/or voltage of the electricity produced by the electricity production unit preferably occurs by passing the electricity through batteries prior to being utilized by the electric motor to propel the vehicle. Assemblies of the present invention may be easily installed at a very reasonable cost in existing vehicles.

10 Claims, 13 Drawing Sheets

(56) References Cited

U.S. PATENT DOCUMENTS

| | | | |
|---|---|---|---|
| 6,668,954 B2 | 12/2003 | Field | |
| 6,815,929 B1 | 11/2004 | Dagan et al. | |
| 6,857,492 B1 | 2/2005 | Liskey et al. | |
| 6,897,575 B1 | 5/2005 | Yu | |
| 6,982,499 B1 * | 1/2006 | Kachi et al. | 307/75 |
| 6,983,212 B2 | 1/2006 | Burns | |
| 7,019,413 B2 | 3/2006 | Kinoshita | |
| 7,122,979 B2 * | 10/2006 | Wilton et al. | 318/400.09 |
| 7,126,312 B2 | 10/2006 | Moore | |
| 7,147,069 B2 | 12/2006 | Maberry | |
| 7,183,746 B1 * | 2/2007 | Carter | 320/116 |
| 7,245,108 B2 | 7/2007 | Chertok et al. | |
| 7,291,934 B2 * | 11/2007 | Bernardi et al. | 290/40 A |
| 7,378,818 B2 | 5/2008 | Fowler et al. | |
| 7,434,636 B2 | 10/2008 | Sutherland | |
| 7,445,064 B2 | 11/2008 | Kim | |
| 7,469,760 B2 | 12/2008 | Kamen et al. | |
| 7,521,814 B2 * | 4/2009 | Nasr | 290/40 C |
| 7,554,291 B2 | 6/2009 | Yoshida | |
| 7,597,388 B1 | 10/2009 | Samuel | |
| 7,633,284 B2 | 12/2009 | Ingram et al. | |
| 7,647,994 B1 | 1/2010 | Belloso | |
| 7,673,713 B2 | 3/2010 | Betz et al. | |
| 7,772,852 B2 * | 8/2010 | Fechalos et al. | 324/430 |
| 7,884,569 B2 | 2/2011 | Ward | |
| 7,910,250 B2 * | 3/2011 | Hsu | 429/403 |
| 7,911,188 B2 | 3/2011 | Wada et al. | |
| 7,950,481 B2 | 5/2011 | Betz et al. | |
| 8,004,219 B2 * | 8/2011 | Mattson | 318/139 |
| 8,011,461 B2 * | 9/2011 | Rodriguez et al. | 180/65.23 |
| 2001/0019256 A1 | 9/2001 | Olsson et al. | |
| 2002/0153178 A1 | 10/2002 | Limonius | |
| 2006/0030450 A1 | 2/2006 | Kyle | |
| 2006/0152189 A1 | 7/2006 | Ambrosio et al. | |
| 2006/0232238 A1 * | 10/2006 | Horii | 320/104 |
| 2006/0237246 A1 * | 10/2006 | Severinsky et al. | 180/65.2 |
| 2008/0094013 A1 | 4/2008 | Su | |
| 2008/0248918 A1 * | 10/2008 | Sastry et al. | 477/15 |
| 2009/0103341 A1 * | 4/2009 | Lee et al. | 363/124 |
| 2009/0160247 A1 * | 6/2009 | Nakamura et al. | 307/9.1 |
| 2010/0044129 A1 * | 2/2010 | Kyle | 180/65.25 |
| 2010/0084207 A1 * | 4/2010 | Wyall | 180/65.22 |
| 2010/0087974 A1 | 4/2010 | Nakajima et al. | |
| 2012/0274145 A1 | 11/2012 | Taddeo | |
| 2013/0127419 A1 | 5/2013 | Peter et al. | |

FOREIGN PATENT DOCUMENTS

| | | |
|---|---|---|
| JP | 2002124302 | 4/2002 |
| JP | 2003092804 | 3/2003 |
| JP | 2010143310 | 7/2010 |
| WO | 2011/056998 A3 | 5/2011 |

OTHER PUBLICATIONS

PCT/US2012/044093 International Search Report and Written Opinion, Jan. 7, 2013.

U.S. Appl. No. 13/532,737 Office Action, Nov. 7, 2013.

* cited by examiner

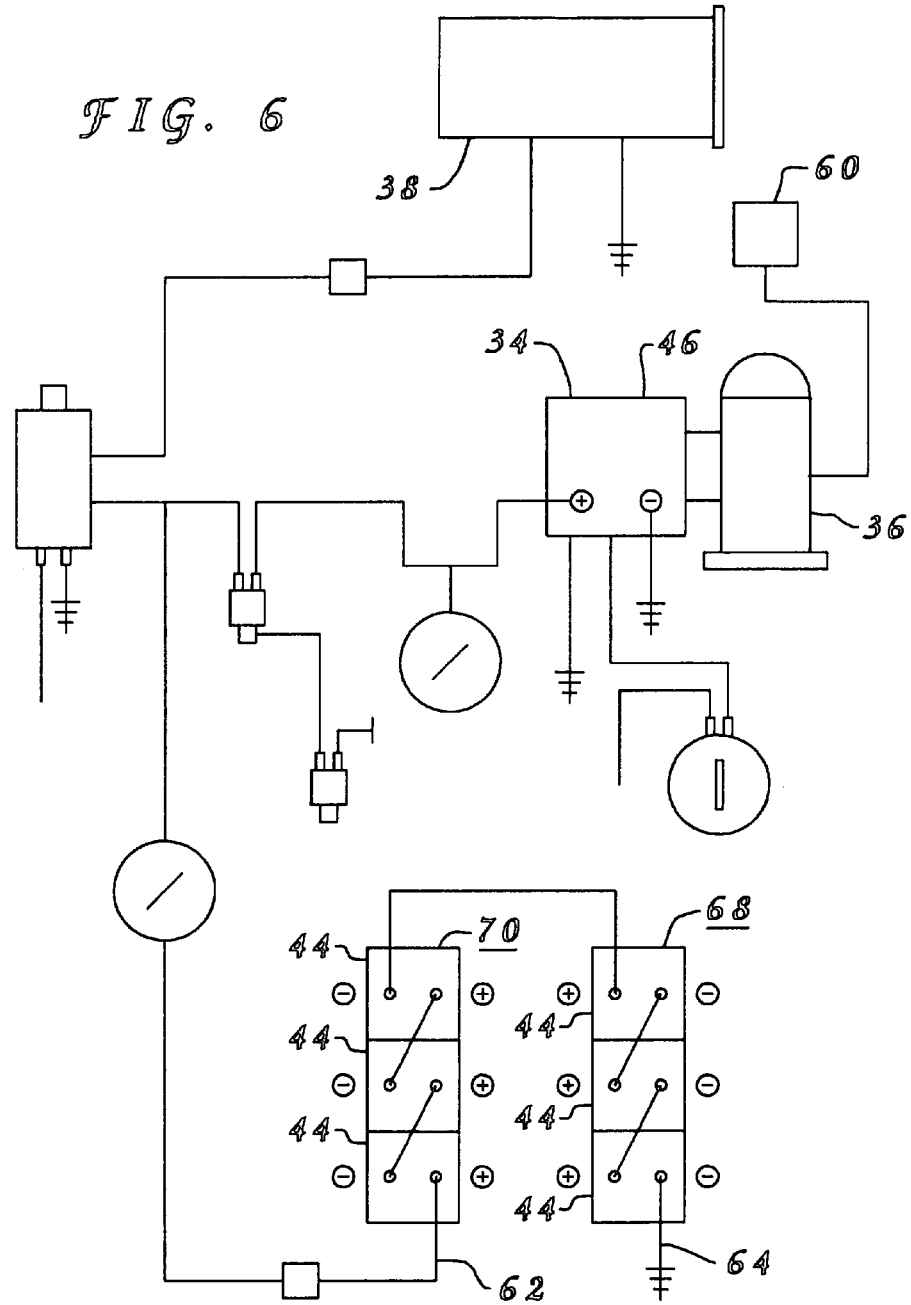

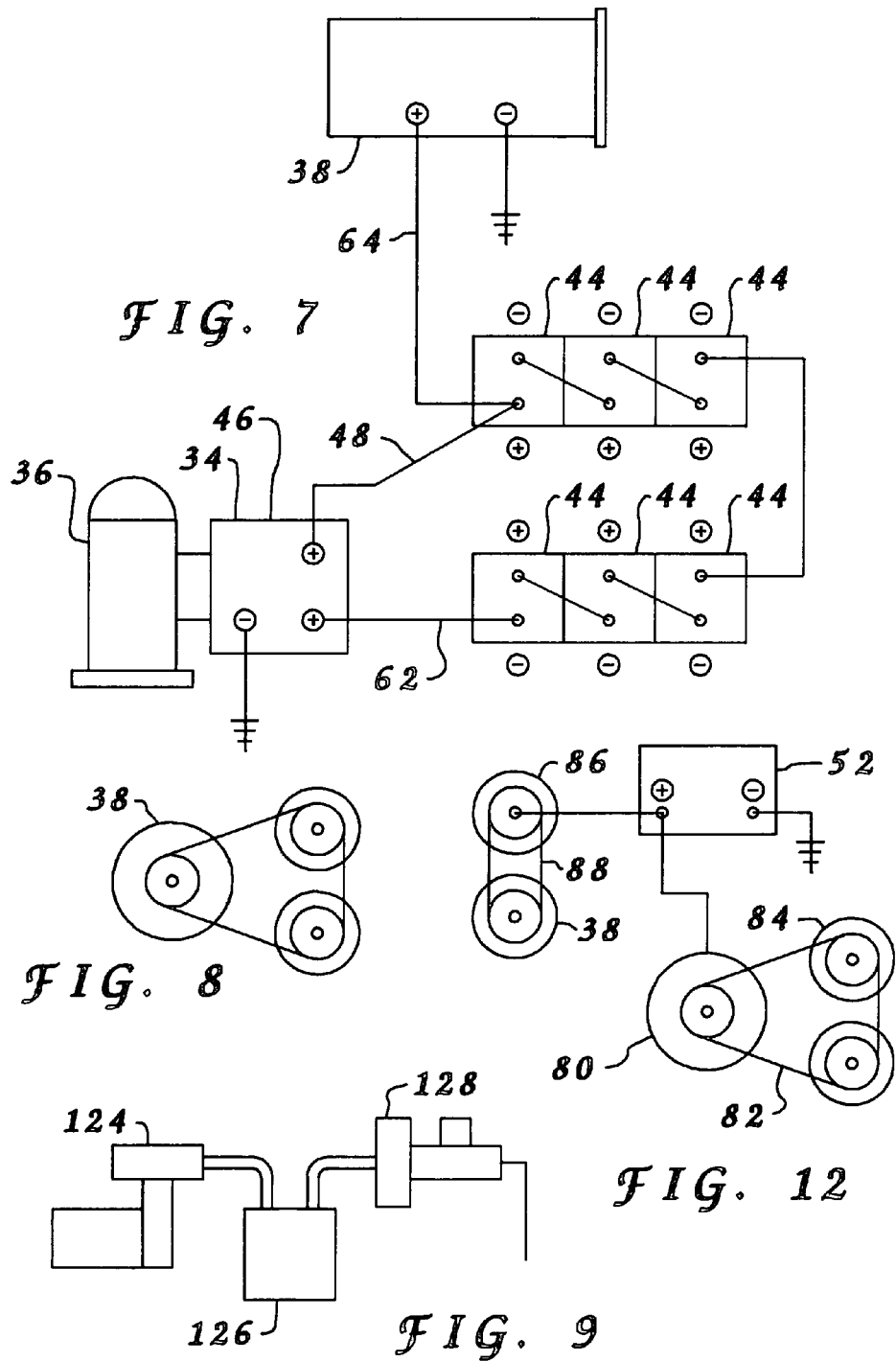

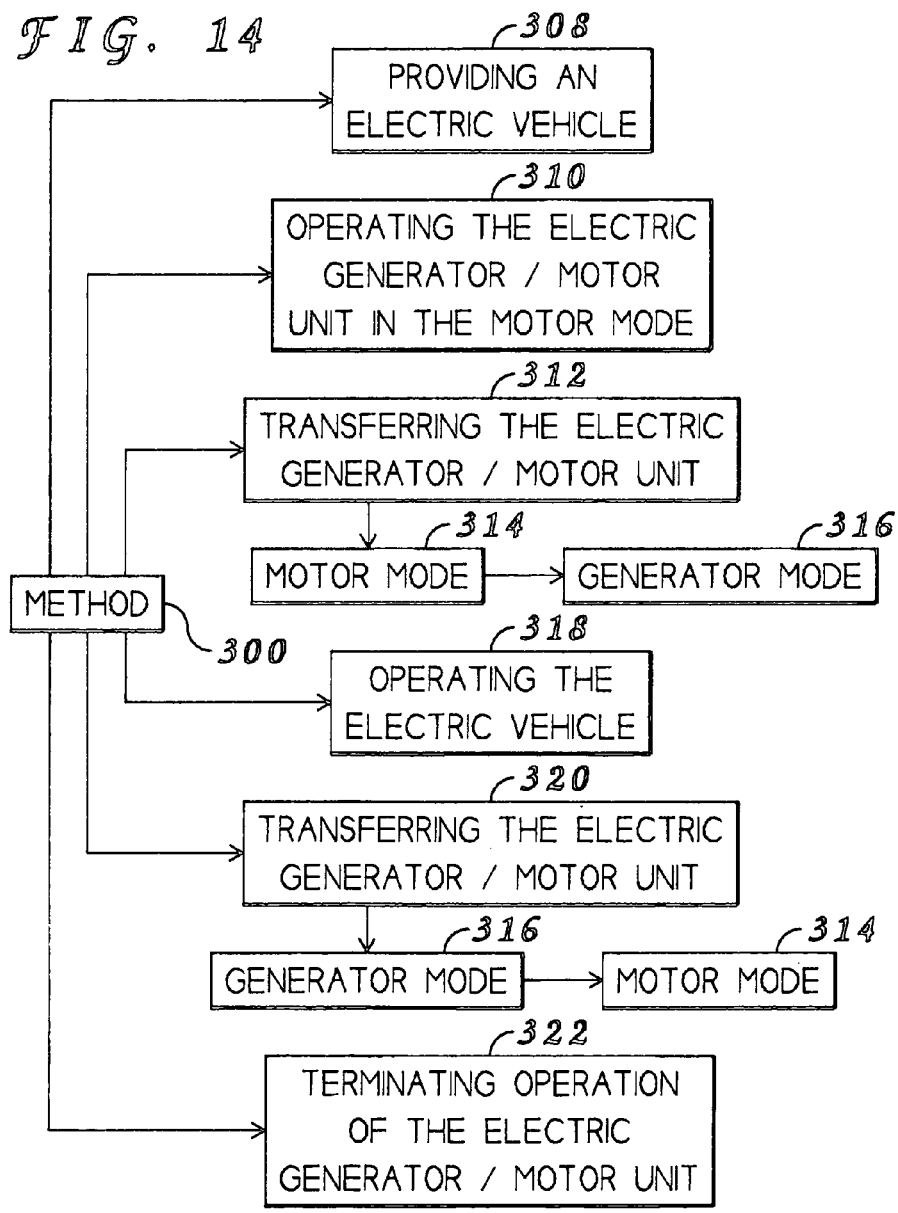

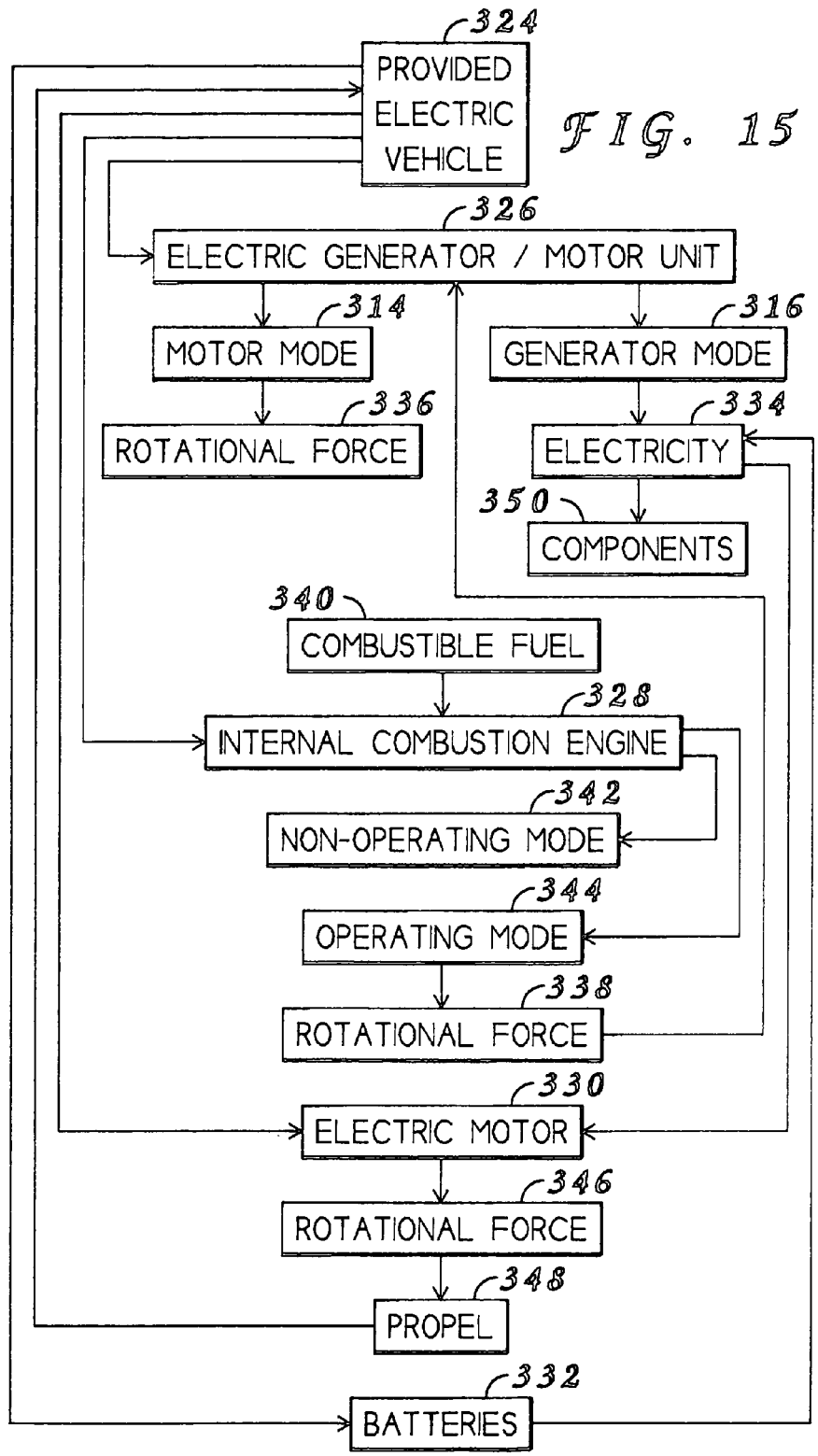

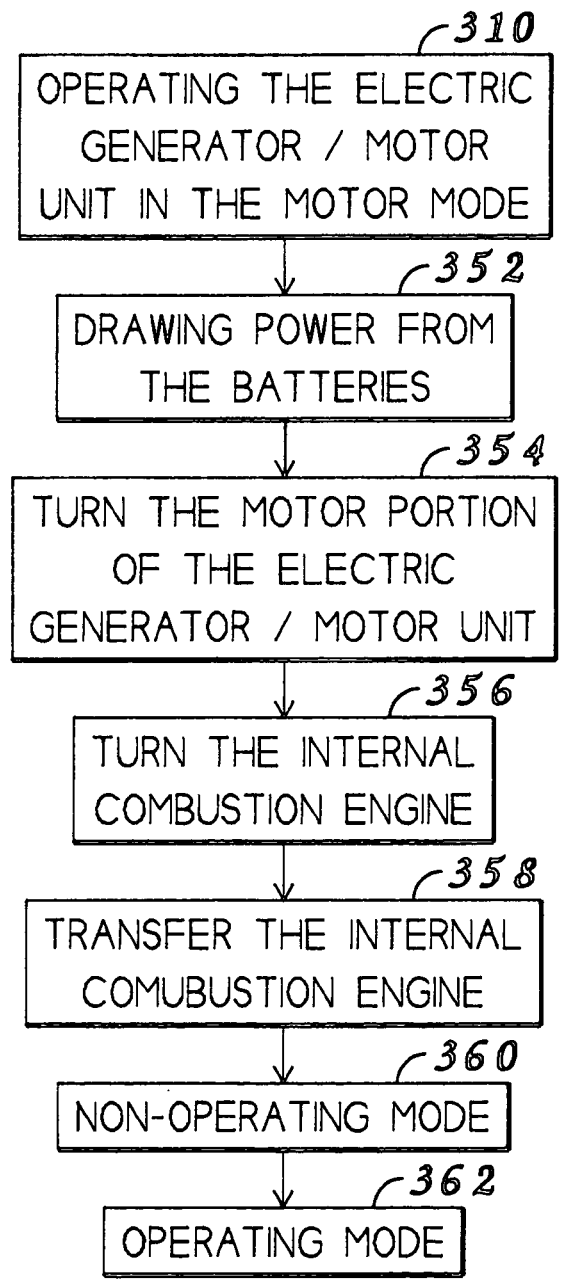

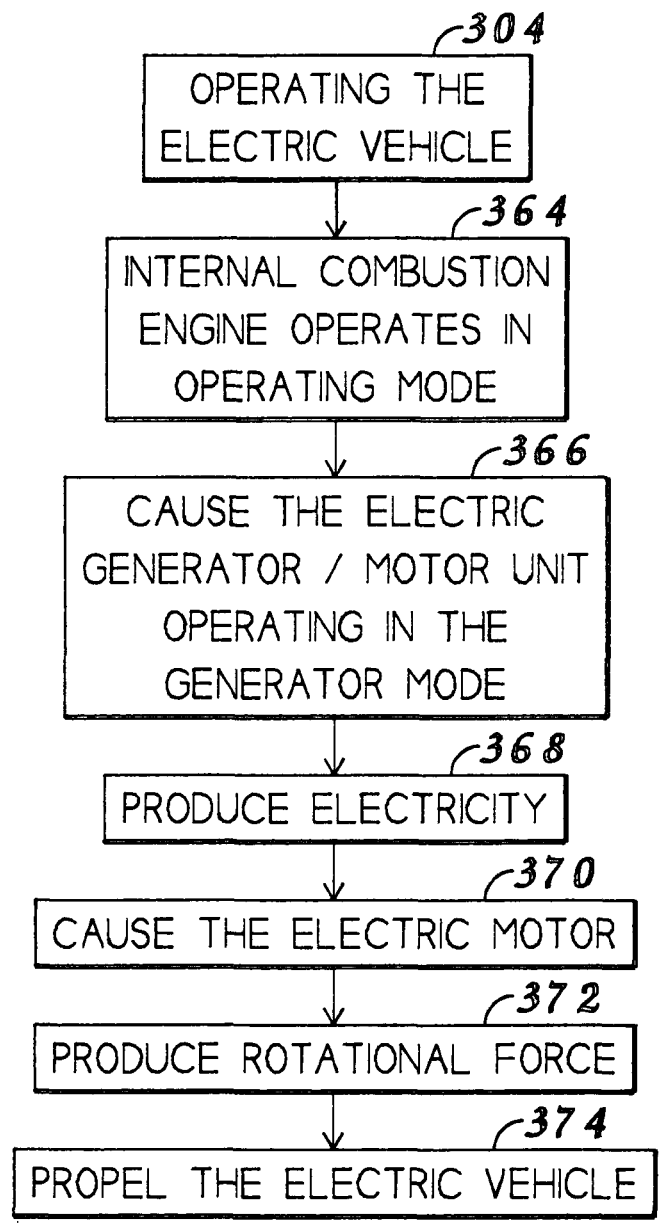

ELECTRIC VEHICLE WITH ONBOARD ELECTRICITY PRODUCTION

BACKGROUND

1. Field of the Invention

Generally, the invention relates to land based electric powered vehicles which utilize roads. More specifically, the invention relates to such electric powered vehicles which mechanically produce electricity onboard.

2. Description of the Prior Art

Numerous methods exist to propel land based vehicles which utilize roads. By far the largest class of such vehicles utilize a petroleum based fuel to power an internal combustion engine which produces rotational output which is then utilized to, rotate at least one wheel to propel the vehicle. The most common fuels utilized by such vehicles are gasoline and diesel. Applicable vehicles include automobiles, trucks and motorcycles.

It has long been known that trains are most efficiently powered by running large internal combustion diesel engines which power electric generators which produce electricity which in turn power electric motors which turn select powered wheels of locomotives which move the train along rails. One major drawback to attempting to utilize the rotational output of the large internal combustion diesel engine to directly drive the wheels of the locomotive is the lack of an adequate transmission apparatus to convert the rotational output of the diesel engine to drive the wheels of the locomotive.

This drawback does not exist for land based vehicles, such as passenger vehicles, vans, trucks, cars and motorcycles, or large diesel powered tractor trailer rigs which pull cargo trailers, which use roads. Transmissions for conversion of rotational output of internal combustion engines to drive wheels for applicable land based vehicles are well known and well developed.

Much work has been done over the years to attempt to increase the miles obtainable from a unit of fuel for internal combustion engine powered land vehicles. These efforts have produced high efficiency vehicles, by current standards. Unfortunately, even the most fuel efficient passenger vehicle based solely on an internal combustion engine commercially available at the time of applicant's invention gets well less than one hundred (100) miles per gallon of petroleum fuel consumed.

A class of vehicles commonly referred to as 'electric' vehicles have been developed which have an electric motor and batteries to provide electricity to the electric motor. The most efficient passenger vehicle in this class commercially available at the time of applicant's invention gets less than one hundred (100) miles per gallon of petroleum fuel consumed, when the cost of electricity to recharge the batteries is converted to a corresponding cost of petroleum fuel. A major drawback of vehicles of this class involve the requirement that the vehicle be attached to an electric outlet supplied with electricity from the power grid at a stationary location. Typically, such 'recharging' occurs at the location where the vehicle is kept, as the time span required to recharge the batteries is significantly longer than the time span typically utilized to deposit gasoline or diesel fuel into a vehicle. It would be difficult, if not impossible, for a typical user to locate a location which would permit attachment of the vehicle to an outlet to 'recharge' the vehicle while out and about when the charge in the batteries is depleted, or reaching depletion. Additionally, due to the slow nature of the typical charging operation, time restraints are a factor for the user to consider. These uncertainty of being able to continue on one's journey, in a timely manner, is a major reason why purely electric vehicles have not been more widely accepted in American society. Another drawback of vehicles of this class involves the nature of applicable batteries which must be completely replaced after a fairly short life cycle, which typically is less than the life cycle of the overall vehicle. Due to the nature and number of the batteries typically deployed with such purely electric vehicles, such replacement costs are significant to the user.

A class of vehicles commonly referred to a 'hybrid' vehicles have been developed which have an internal combustion engine and an electric motor. Batteries carried onboard are utilized to store electricity for use by the electric motor. Such vehicles utilize the electric motor to power the vehicle under certain conditions and utilize the internal combustion engine to power the vehicle under certain other conditions. Certain vehicles in this class also utilize both the electric motor and the internal combustion engine to power the vehicle under certain conditions. Typically, the batteries are recharged while the vehicle is stationary and attached to an electric outlet supplied with electricity from the power grid, as is typically done with purely electric vehicles. Some of these vehicles utilize exotic charging arrangements to produce some electricity for storage during usage of the vehicle, such as during braking of the vehicle. The most efficient passenger vehicle in this class commercially available at the time of applicant's invention gets well less than one hundred (100) miles per gallon of petroleum fuel consumed, when the cost of electricity to recharge the batteries is converted to a corresponding cost of petroleum fuel. Another drawback of vehicles of this class involves the cost of the actual vehicle which is typically greater than the cost of an applicable conventional internal combustion engine vehicle. A similar drawback to purely electric vehicles for vehicles of this class involves the nature of applicable batteries which must be completely replaced after a fairly short life cycle, which typically is less than the life cycle of the overall vehicle.

Various deficiencies exist with all conventionally known land based vehicles which operate on roads. As can be seen various attempts have been made to make land based vehicles more cost efficient to own and operate. These attempts have been less efficient than desired. As such, it may be appreciated that there continues to be a need for a land based vehicle which has an electric motor to propel the vehicle and a mechanical device on the vehicle to produce electricity during use of the vehicle to supply the electric motor with electricity. The present invention substantially fulfills these needs.

SUMMARY

In view of the foregoing disadvantages inherent in the known types of land based vehicles which operate on roads, your applicant has devised an electric vehicle with onboard electricity production having a body, an electricity production unit, mechanical means to drive the electricity production unit and an electric motor. A key feature of the present invention rests in use of a high efficiency electricity production unit with high voltage output. The high efficiency electricity production unit, such as a generator of the brushless type which has an efficiency in the ninety four (94) percent range compared to standard generators which have efficiencies in the sixty (60) to sixty four (64) percent range. Additionally, the high voltage output electricity production unit has an output voltage selectively of thirty six (36), forty eight (48) or seventy two (72) volts DC compared to standard generators which have voltage output of either twelve (12) or twenty four

(24) volts DC. The body has an operator position and wheels. The electricity production unit creates electricity. The electricity production unit is of a lightweight type while producing high electricity output at low horsepower rotation. The mechanical means to drive the electricity production unit creates the low horsepower rotation of the electricity production unit. While a small, extremely fuel efficient, internal combustion engine is the preferred method of driving the electricity production unit, other possibilities are possible and envisioned. The electric motor utilizes the electricity created by the electricity production unit to propel the vehicle using at least one of the wheels of the electric vehicle with onboard electricity production. Components of the present invention may be installed in existing internal combustion powered vehicles to convert them to high efficiency vehicles.

My invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore a primary object of the present invention to provide for a land based vehicle for use on roads which achieves extremely high mileage for each gallon of petroleum fuel consumed.

Other objects include;

a) to provide for the vehicle to have an internal combustion engine powering an electricity production unit producing electricity which in turn powers an electric motor which powers at least one drive wheel of the vehicle.

b) to provide for the internal combustion engine to operate at all times that the vehicle is in operation.

c) to provide for the electricity production unit to be a brushless generator type electricity production unit.

d) to provide for the vehicle to have batteries to store electricity to supplement during peak periods of usage that electricity being created by the electricity production unit to enhance performance of the vehicle during those peak periods of usage.

e) to provide for the vehicle to have a solar panel to trickle charge the batteries of the vehicle to ensure full charging of the batteries to their respective peak charge capacity.

f) to provide for the vehicle to have stationary power output capabilities where the vehicle may provide electricity at any stationary location where the vehicle may be positioned for various useful purposes.

g) to provide for the electricity produced by the electricity production unit to be converted, during passage through the batteries, to a higher voltage and/or a higher amperage for use by the electric motor.

h) to provide for a kit having an internal combustion engine, an electricity production unit, batteries and an electric motor which will be installed in existing automobiles after removal of certain components of the subject automobile to easily convert the subject automobile into an extremely high efficiency electric vehicle with onboard electric production capabilities at a very reasonable cost.

i) to provide for use of a high efficiency generator of a brushless type which has an efficiency in the ninety four (94) percent range, which is well above that available from standard generators in the sixty (60) to sixty four (64) percent range.

j) to provide for use of a high efficiency generator of a brushless type which has an output voltage, such as thirty six (36), forty eight (48) or seventy two (72) volts DC, which is well above that available from standard generators of either twelve (12) or twenty four (24) volts DC.

k) to provide for use of a very low horsepower, such as six (6) horsepower, internal combustion engine to produce rotation of the high efficiency generator.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein;

FIG. 6 is a graphical depiction of a wiring system for an electric vehicle with onboard electricity generation.

FIG. 7 is a graphical depiction of system to utilize a motor/generator to start a diesel engine the to drive the motor/generator utilizing the diesel engine.

FIG. 8 is a graphical depiction of powering accessories utilizing an electric drive motor.

FIG. 9 is a graphical depiction of enhancing vacuum capacity to assist power brakes for an electric vehicle with onboard electricity generation.

FIG. 12 is a graphical depiction of an accessory drive system.

FIG. 13 through FIG. 23 are flow charts depicting various features of a method associated with the present invention.

DESCRIPTION

Figure 1:
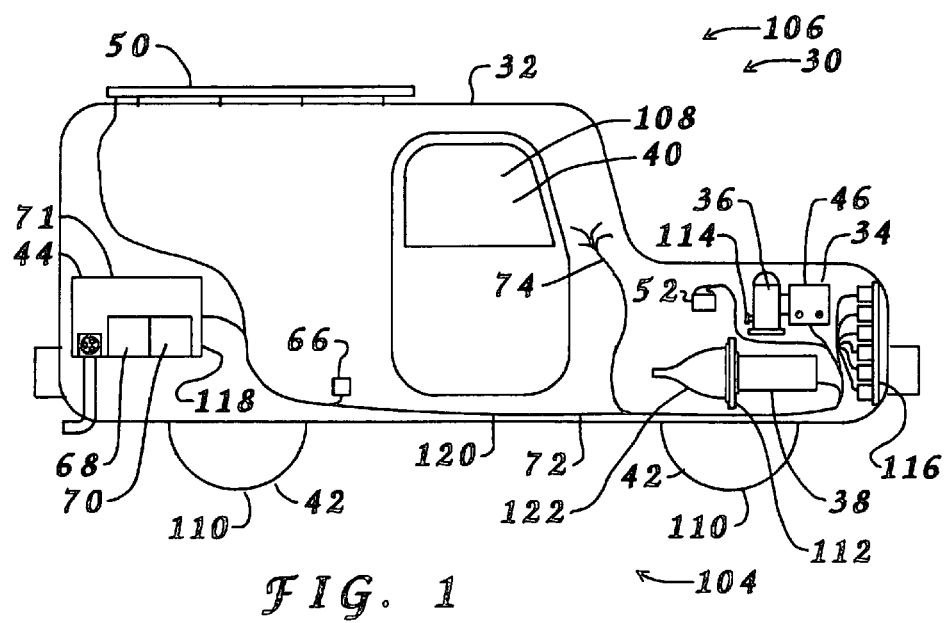
FIG. 1 is a graphical depiction of components of a conversion kit installed in a vehicle to convert the vehicle to an electric vehicle with onboard electricity generation.

Many different vehicles having features of the present invention are possible. The following description describes the preferred embodiment of select features of those vehicles and various combinations thereof. These features may be deployed in various combinations to arrive at various desired working configurations of vehicles.

Reference is hereafter made to the drawings where like reference numerals refer to like parts throughout the various views.

Overview

The present invention provides for a "high output propulsion electric" (HOPE) electric vehicle with onboard electricity production. Conventional electric vehicles utilize batteries to provide electricity to the electric drive motor of the electric vehicle. Drive batteries of electric vehicles having features of the present invention may be used to propel the electric vehicle in the absence of onboard production of electricity. More preferably, such batteries will be utilized to amplify and condition electricity produced by onboard production of electricity.

The industry will be forced to shift to seventy-two (72) to one hundred and forty four (144) volt DC platforms for onboard electricity generation. This is sufficient to power ninety (90) to two hundred (200) horsepower DC motors which are capable of propelling conventional size automobiles at highway speeds.

A key feature of the present invention rests in use of a high efficiency electricity production unit with high voltage output. A generator of the brushless type is utilized which has an efficiency in the ninety four (94) percent range. This compares to standard generators which have efficiencies in the sixty (60) to sixty four (64) percent range: The brushless type generator has an output voltage in the range of thirty six (36), forty eight (48) or seventy two (72) volts DC. This compares to standard generators which have voltage output of either twelve (12) or twenty four (24) volts D.C.

An electricity production unit that converts mechanical energy into electrical energy is called a generator, an alternator, or a dynamo. Generators and alternators are devices used to convert mechanical energy into electrical energy by electromagnetic means.

Preferably the electricity production unit deployed on an electric vehicle will put out a lower voltage and a higher amperage than required for optimum performance by the electric drive motor of the electric vehicle.

An electric vehicle 30, see FIG. 1, will have a body 32, an electricity production unit 34, mechanical means to produce rotation of electricity production unit, depicted in the preferred form of an internal combustion engine 36, and an electric drive motor 38. Body 32 has an operator position 40 for an operator, the operator not shown, and wheels 42. Electricity production unit 34 has capabilities to create electricity from a rotational input created by internal combustion engine 36. The mechanical means to produce rotation of electricity production unit 34 may take many forms, but typically will involve internal combustion engine 36, either fueled by gasoline or diesel. Electric drive motor 38 has capabilities to create rotational output from electricity. Typically, power storage means, ideally in the form of at least one battery 44, stores electricity for use by components of electric vehicle 30.

Electricity Production Unit

An electricity production unit carried on the electric vehicle will produce electricity during at least portions of use of the electric vehicle. The electricity production unit, depending upon type selected for deployment, can create electricity in direct current (DC) or in alternating current (AC). While a single electricity production unit will be sufficient for most deployments, it is possible to provide for installation of multiple electricity production units when desired or required. When two or more electricity production units are utilized they may be configured to always operate simultaneously or they may be configured to operate independently. One such example provides for commencement of electricity production from a second, auxiliary, electricity production unit when power demands exceed a capacity of a first, primary, operating electricity production unit. As mentioned the electricity production unit may be a generator type or an alternator type, with both of these types being well known in the art.

Conversion of direct current to alternating current is accomplished by a device called a rectifier. A rectifier is a semiconductor that permits electrons to flow only in one direction. A similar process converts alternating current to direct current for various uses.

There exist various types of generators with the following provided merely as common examples. Series wound generators have their field in series with the armature and which supplies a constant current at variable voltage. Shunt wound generators have their field connected in parallel with the armature and which deliver a comparatively constant voltage under varying electrical loads. Compound wound generators have part of their fields in series and part in parallel and which deliver a comparatively constant voltage under varying electrical loads. A magneto generator is a small generator with a permanent-magnet field.

The basic components of devices which create electricity are a magnet and a coil of copper wire wound into loops. Two methods exist to generate an electric current. In the first method the magnet may rotate inside the coil. In the second method the coil may rotate in a magnetic field created by a magnet. The component that remains stationary is called the stator, and the component that moves is called the rotor. For alternators the coil is the stator and the magnet is the rotor. Some source of mechanical power turns the rotor.

Generators normally rotate the coil which is heavier than the magnet. Alternators normally rotate the magnet which is lighter than the coil. Since alternators are built to spin the lighter component instead of the heavier one they generally weigh less than half the weight as generators of the same capacity. Alternators also can run at high rotational speeds then corresponding output generators without arcing problems.

In the simplest form an alternating current generator, alternator, differs from a direct current generator in two ways. The ends of the alternator's armature winding are brought out to solid unsegmented slip rings on the alternator shaft instead of to commutators. The field coils of the alternator are energized by an external power source rather than by the alternator itself. Low-speed alternators are built with as many as one hundred poles, to improve their efficiency and to attain more easily the frequency desired. High speed alternators, such as driven by high-speed turbines, are often two-pole devices. The frequency of the current delivered by an alternator is equal to half the product of the number of poles and the number of revolutions per second of the armature.

Magnets have a north pole, or positive end, and a south pole, or negative end. They generate a magnetic field that attracts electrons toward the positive end and pushes electrons away from the negative end. The net effect causes electrons moving near the magnet to flow in a certain direction. As the magnet in an alternator rotates, the magnetic field it generates changes direction, and electrons in the coil around the magnet are pulled one direction first, then the other. The changes in direction occur as fast as the magnetic field changes. Each change from one direction to the other and back again is called a cycle. Most alternating current is generated at 50 or 60 cycles per second, or hertz (Hz). The strength of the current generated depends on the speed of the rotor, the strength of the magnetic field, and the size of the coil. The more perpendicular the magnetic field is to the wound wires of the coil, the greater the electrical current and energy output.

Generator and battery hookups will be in parallel so the rotational speed of the internal combustion engine will adjust the changing of the battery pack. The higher the revolutions per minute (RPM) of the internal combustion engine which drives the generator the higher the amperage output of the generator.

FIG. 1, FIG. 4, FIG. 6 and FIG. 7 depicts electricity production unit 34 as being a generator type electricity production unit 46. In a preferred embodiment generator type electricity production unit 34 is of the brushless type, as conventionally known in the art. Electricity production unit 34 creates electricity from rotational input. Electricity production unit 34 being lightweight and producing high electricity output from a relatively low horsepower rotational input.

In certain embodiments electricity production unit 34 will also have electric motor capabilities where generator type electricity production unit 46 may selectively creating a rotational output utilizing an introduction of electricity, see FIG. 7. In this embodiment generator type electricity production unit 46 will also have the capability of producing electricity utilizing an introduction of rotational input. In this embodiment rotational output of electricity production unit 34 is utilized to start rotation of the mechanical means, internal combustion engine 36, to produce subsequent rotation of electricity production unit 34. In this embodiment rotational output of electricity production unit 34 may also be utilized during a stopping of rotation of the mechanical means, internal combustion engine 36, to produce rotation of electricity production unit 34. Means to draw electricity, in this embodiment a cable 48, from power storage means, typically batteries 44, and create a rotational output to transfer mechanical means, in this embodiment internal combustion engine 36, to create low horsepower rotation of electricity production unit 34 from an inactive state to an active state. At the opposing end of an operational cycle, when transferring electricity production unit 34 from active state to inactive state, the same means to draw electricity from power storage means may be utilized to create rotational output from mechanical means to permit transfer of electricity production unit from active state to inactive state.

Without regard for the type of structural component performing the task of the electricity production unit, electricity production unit 34 will have a standard voltage and a standard amperage at a normal operating condition.

Solar Panel

Preferably at least one solar panel will be positioned on the electric vehicle to create electricity when exposed to the sun. The created power may be utilized to charge the drive batteries, charge the accessory battery or directly run electric motors, such as an accessory motor. A fairly inexpensive commercial solar panel is available at the time of the invention which is rated at forty amps at twelve volts direct current output. Because of the nature of batteries, it is not possible to bring batteries to full charge capacity utilizing high amp input, such as would exist from electricity production units of the present invention. A slower, trickle charge, such as available from a solar panel, would permit bringing the deployed drive batteries to a full charge on a fairly regular basis. In the alternative, a plug in charger, to the electric grid, will permit bringing the drive batteries to a full charge from time to time.

It being understood that full charging the drive batteries occasionally will enhance the life span of the drive batteries beyond that obtainable if the drive batteries are never brought to full charge.

Because air conditioning in vehicles is required more when the sun is shining and temperatures are greater, it is desirable to have the air conditioner compressor powered by a separate direct current motor. For a conventional passenger size vehicle a three (3) horsepower direct current motor is sufficient which typically requires less than twenty amps to power under load. Therefore, the sun can supply the electricity need, in combination with an accessory battery, to power the deployed air conditioner unit even when the drive system components of the vehicle are not operating, such as when the vehicle is parked. Thus the vehicle may remain cool inside even when parked in the sun. While well suited to electric vehicles, such an arrangement may be install in, and work for, conventional internal combustion vehicles. Preferably the solar panel will be mounted on the roof of the electric vehicle although other areas are well suited.

Figures 10, 11:
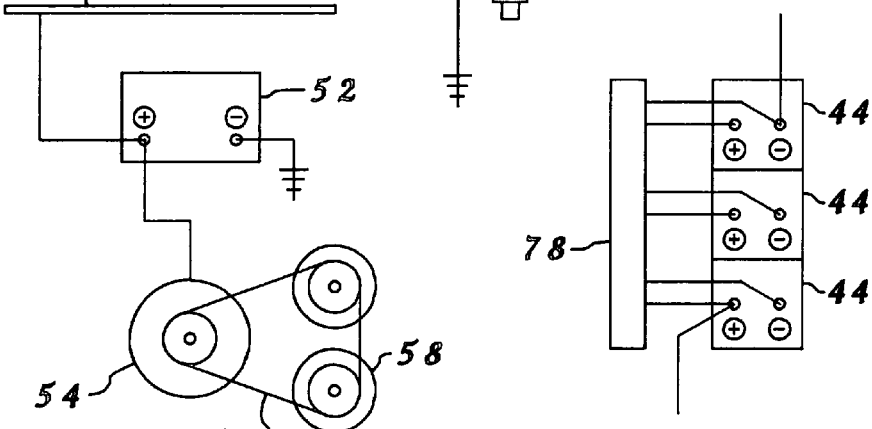
FIG. 10 is a graphical depiction of a system to power an accessory utilizing a solar panel and an auxiliary battery.
FIG. 11 is a graphical depiction of a battery balancing system.

FIG. 10 depict a solar panel 50, also see FIG. 1, an accessory battery 52, a direct current motor 54, a drive belt 56 and an air conditioner compressor 58. Accessory battery 52 receives electricity from solar panel 50. Direct current motor 54 draws power from accessory battery 52. Direct current motor 54 causes rotation of drive belt 56 which in turn powers air conditioner compressor 58. If desired, direct current motor 54 may draw power from other sources present on the subject vehicle.

Mechanical Means (Engine)

It is a requirement of the invention that relatively low horsepower rotation of the electricity production unit be provided by some mechanical device. The art is rich in mechanical devices capable of performing this function and many of these devices may be utilized with the present invention. When an internal combustion engine is utilized it may use gasoline, diesel, bio-diesel, liquid propane, or some other suitable fuel.

FIG. 1, FIG. 4, FIG. 6 and FIG. 7 depict mechanical means, in the preferred embodiment of internal combustion engine 36, which creates low horsepower rotation of electricity production unit 34. Internal combustion engine 36 is capable of producing rotational force while consuming a combustible fuel 60, see FIG. 6. Combustible fuel 60 preferably will be either a gasoline fuel or a diesel fuel. Mechanical means, internal combustion engine 36 in the various views, has inactive state and active state. Inactive state does not produce the low horsepower rotation of electricity production unit 34 while active state does produce the low horsepower rotation of electricity production unit 34.

Electric Motor

An electric motor will be provided capable of propelling the electric vehicle at a suitable speed depending upon a weight of the electric vehicle. Such electric motors are well known in the field and numerous selection are available.

Electric motors can be similar to generators in construction. When current is passed through the armature of an electric motor, a torque is generated by magnetic reaction, and the armature revolves. The action of the commutator and the connections of the field coils of electric motors are generally the same as those used for generators. The revolution of the armature induces a voltage in the armature windings. This induced voltage is opposite in direction to the outside voltage applied to the armature, and hence is called back voltage or counter electromotive force. As the electric motor rotates more rapidly, the back voltage rises until it is almost equal to the applied voltage. The current is then small, and the speed of the motor will remain constant as long as the motor is not under load and is performing no mechanical work except that required to turn the armature. Under load the armature turns more slowly, reducing the back voltage and permitting a larger current to flow in the armature. The motor is thus able to receive more electric power from the source supplying it and to do more mechanical work.

Because the speed of rotation controls the flow of current in the armature, special devices must be used for starting DC motors. When the armature is at rest, it has virtually no resistance, and if a normal working voltage is applied, a large current will flow, which may damage the commutator or the armature windings. A usual method of preventing such damage is the use of a starting resistance in series with the armature to lower the current until the motor begins to develop an adequate back voltage. As the motor picks up speed, the resistance is gradually reduced, either manually or automatically.

The speed at which a DC motor operates depends on the strength of the magnetic field acting on the armature, as well as on the armature current. The stronger the field, the slower is the rate of rotation needed to generate a back voltage large enough to counteract the applied voltage. For this reason the speed of DC motors can be controlled by varying the field current.

FIG. 1, FIG. 3, FIG. 6, FIG. 7 and FIG. 8 depict electric drive motor 38 which utilizes the electricity, including that created by electricity production unit 34, to propel electric vehicle 30 using at least one wheel 42 of electric vehicle 30. In certain situations electric drive motor 38 may utilize stored electricity to propel electric vehicle 30. Many versions of electric motors are known in the art to propel a vehicle and many of these may be utilized with the present invention. As is conventionally known various types of and configurations of transmissions may be utilized to permit a controlled use of rotational output from electric drive motor 38 to propel electric vehicle 30.

Power Storage Means (Batteries)

A battery box to contain the batteries will be installed within the electric vehicle. Typically, this will occur within an area corresponding to a conventional storage area of the vehicle, such as within the trunk. The battery box preferably will contain an exhaust fan and exhaust conduit to the outside to prevent introduction of fumes to the electric vehicle.

Standard automobile batteries may be used with the present invention. This provides for an extremely inexpensive and reliable source for the required power storage means. This is particularly true as the batteries of the present invention which are maintained constantly in a charged state. This is radically different from conventional electric vehicles which draw power from their batteries and receive a charge when stationary and the electric vehicle is not in use as a vehicle. While inexpensive and commonly available automobile batteries are acceptable, more expensive lithium based batteries may be utilized for various reasons.

FIG. 1, FIG. 3, FIG. 4, FIG. 5, FIG. 6 and FIG. 7 depict power storage means, in the preferred embodiment batteries 44, store electricity for use by electric drive motor 38 and other components of electric vehicle 30. Batteries 44 have a standard electricity delivery method, in the form of cables 62 and 64, for withdrawal of electricity from batteries 44, the power storage means. Batteries 44 have a standard electricity acceptance method, also in the form of cables 62 and 64, for depositing of electricity into batteries 44, the power storage means. The standard electricity delivery method of the power storage means has a standard voltage and a standard amperage at a normal operating condition. While one (1) battery 44 may be utilized for the present invention, typically a plurality of batteries 44 are utilized.

Battery sensors 66, see FIG. 1, will be used to start and stop electricity production unit 34 and/or internal combustion engine 36 to maximize fuel economy depending upon power levels within batteries 44.

In a preferred embodiment two separate banks of batteries 44 will be deployed. Using FIG. 1 and FIG. 5 as an example, a first battery bank 68 and a second battery bank 70, contained with battery box 71, will cooperate to provide electricity to electric drive motor 38. As detailed elsewhere herein, electricity from electricity production unit 34 will be cycled between being supplied to first battery bank 68 while not being supplied to second battery bank 70 and between being supplied to second battery bank 70 while not being supplied to first battery bank 68 in a continuously cycling manner.

Wiring Harness

A wiring harness will connect the various components together. A portion of the wiring harness will carry electricity from the electricity production unit to the battery pack and from the battery pack to the electric motor. The wiring harness, or a separate wiring harness, will provide for incorporation of the necessary components within the operator compartment of the electric vehicle. Examples of such components include operating gauges or indicators and other user manipulated controls necessary to operate the electric vehicle. For conversion assemblies the existing accelerator pedal coupling, or replacement with a dedicated unit, will provide for user control of the conversion electric vehicle. Because the braking system normally will remain unaffected by the conversion, the brake pedal will continue to operate as conventionally known for the vehicle being converted.

FIG. 1 depicts a wiring harness 72 which links electricity production unit 34 with battery banks 68 and 70 and battery banks 68 and 70 with electric drive motor 38. A tentacle 74 of wiring harness 72 extends into an operator position 40 and connects with various components to permit operator control over electric vehicle 30.

Combination of Electricity

It is possible to generally match the voltage output of the electricity production unit with the voltage requirement of the electric motor. As an example, a generator which outputs seventy two (72) volts DC at one hundred and fifty (150) amps may be mated with an electric drive motor which produces sufficient output torque with an input of seventy two (72) volts DC at one hundred and fifty (150) amps. For various reasons, it is occasionally more efficient to utilize a generator with outputs a significantly lower voltage but does so at a significantly higher amperage. For these deployments it is necessary to condition the output electricity from the electricity production unit to make it compatible with the deployed electric drive motor. Various electricity conditioning methods exist, and may be utilized for the present invention. A preferred method involves deploying multiple banks of batteries with output from the generator going into a single bank of batteries at a time while electricity is drawn simultaneously from multiple banks of batteries for use by the electric drive motor. Using the electric drive motor from the above example a generator which outputs thirty six (36) volts DC in the range of two hundred and fifty (250) to three hundred (300) amps may be used with two (2) banks of three (3) twelve (12) volt DC batteries.

When the voltage of the electricity production unit (generator or alternator) is not the same as the collection of battery packs from which electricity is being drawn by the electric drive motor then an isolated ground is utilized instead of a common ground.

Preferably the power production unit will produce electricity at a lower voltage than required to power the electric motor utilized to propel the vehicle while the produced electricity will be of a higher amperage than required to power the electric motor utilized to propel the vehicle. In order for the electricity provided to the electric motor to be within an acceptable voltage range and within an acceptable amperage it is necessary to convert the electricity. While numerous methods exist to provide this conversion, an acceptable method involves passing the produced electricity through batteries. This arrangement provides for the electric motor to draw electricity consumed by the electric motor directly from all of the deployed drive batteries. It being understood that, as mentioned elsewhere herein, it is preferred that all other electric powered components of the electric vehicle be separately powered from an accessory battery and an accessory alternator. The drive batteries ideally will be in two identical battery packs which will alternate in receiving power from the electricity production unit while simultaneously providing electricity to the electric motor of the electric vehicle. This arrangement provides for a pass through of a certain amount of the electricity produced by the electricity production unit while maintaining a generally full charge to the battery pack actively receiving power from the electricity production unit. While numerous types of batteries may be utilized for the present invention, deep cycle marine twelve volt DC, one thousand amp batteries are well suited. This is especially true when used in two battery banks each having three such deep cycle batteries for a total of six drive batteries.

It is possible to provide for direct current capacitors to be utilized to provide addition electricity capacity to the electric motor propelling the electric vehicle at select times, such as during acceleration. Such capacitors, conventionally known in the art, are designed to receive and store electricity and rapidly discharge such electricity. Any number of capacitors, or groups of capacitors, may be deployed within the electric vehicle to ensure optimum performance during acceleration, including over numerous accelerations over a compressed time period. It being understood that the electricity production of the electric vehicle will be at maximum during peak acceleration with the electricity provided by discharge from the capacitors supplementing such produced electricity. This will permit a radical increase in the output horsepower of the electric vehicle. This will ensure that the operator of the electric vehicle has the performance conventionally provided by internal combustion engine vehicles. This will overcome one of the major drawbacks of conventionally known electric vehicles.

Referring now to FIG. 1 and FIG. 6, it is preferred that electricity producing by electricity production unit 34 and electricity withdrawn from batteries 44 be combined to form an enhanced electric current. This combination of electricity may provide for an enhanced electric current having a voltage which is greater than a voltage of electricity produced by electricity production unit 34 or a voltage of electricity provided by batteries 44. This combination of electricity may provide for an enhanced electric current having an amperage which is greater than an amperage of electricity produced by electricity production unit 34 or an amperage of electricity produced by batteries 44. This combination of electricity may provide for an enhanced electric current having a voltage and an amperage which are both greater than a voltage and an amperage of electricity produced by electricity production unit 34 or a voltage and an amperage of electricity provided by batteries 44.

Balancing of Batteries

In certain situations the batteries in a bank of multiple batteries will become unbalanced during use where different levels of energy are stored within each of the respective batteries. In these situations the charging system will read a condition of a first battery within the bank of batteries and the subsequent batteries will not be brought to full charge.

When a plurality of batteries 44 are provided, see FIG. 11, and depending upon the configuration of the couplings 76 between individual batteries 44, it is occasionally necessary to cycle through each battery 44 to balance the electrical power stored therein. This is provided for by utilizing isolation means, in the form of a master isolation terminal 78, to provide for briefly isolating each battery 44 of plurality of batteries 44 during at least a portion of a charging period of the standard electricity acceptance method. This isolation of each battery 44 from the other batteries of plurality of batteries 44 returns the respective battery 44 to a predefined uniform charged condition.

Accessories

When the electric vehicle is produced as a production unit all necessary accessories, such as air conditioning, power steering, heating, may readily be incorporated into such production. When the electric vehicle is the result of conversion of an existing vehicle the necessary accessories may be those deployed on the vehicle to be converted prior to conversion or may be replacement units installed at the time of conversion of the existing vehicle.

The air conditioner can be set on auto and the interior of the car will be cool when parked outside for hours, even in the hot summer. This is because power for the air conditioner is drawn from an auxiliary battery which is replenished by solar panels when exposed to sunlight. Automatic controls can adjust use of the air conditioner to prevent the auxiliary battery's power level from being decreased below a predefined level.

It is a preference that any components of the electric vehicle which utilize electricity draw that power from a dedicated battery and/or from a dedicated alternator. Such components include all operating lights, electric windows, electric door locks and truck releases, electric heaters, radios/cd players to name a few. This will isolate the power utilized to propel the electric vehicle and permit a more uniform operation to be obtained and maintained. It is entirely possible to provide for the rotational power to power the accessories to come from the drive system of the electric vehicle.

To increase safety issues with vacuum pump assisted power brakes a canister of sufficient volume is added as a residual cap tank to increase vacuum in system. This feature ensures full function of the power assist to the power brakes even when the electric vehicle has been operating a minimal levels for a prolonged period of time or when the brakes have been utilized repeatedly during a short period of time.

FIG. 12 depicts accessory battery 52, a direct current motor 80, a drive belt 82 and a power steering pump 84. Accessory battery 52 receives electricity from an alternator 86 which is powered by a main drive belt 88 while electric vehicle 30 is operating. Direct current motor 80 draws power from accessory battery 52. Direct current motor 80 causes rotation of drive belt 82 which in turn powers power steering pump 84. FIG. 1 depicts various accessories such as a heater element, an air conditioning compressor, a power steering pump, a power brakes pump and a vacuum pump.

Safety Features

Various safety features preferably will be provided for within the electric vehicle, without regard for in the electric vehicle is a production unit or results from conversion of an existing vehicle. Preferably, an emergency shutoff will be provide to selectively terminate all output from the battery pack. Preferably, an emergency shutoff will be provide to selectively terminate operation of the electricity production unit and/or the small internal combustion engine to prevent the electricity production unit from having electricity output. These shutoffs can be configured to be automatic in case of an accident, may be a manual shutoff, or preferably both. This will prevent danger from electric shock to all parties, including occupants of the converted vehicle as well as responding emergency personal, in the case of an accident involving the electric vehicle. Numerous types of sensors may be utilized to determine that an accident has occurred without regard for if the accident involves a rollover, a front impact, a side impact or a rear impact. Additional, any power transfer cabling, especially when applicable components are positioned at opposing ends of the electric vehicle, will be contained with conduit and shielded.

Figure 2:
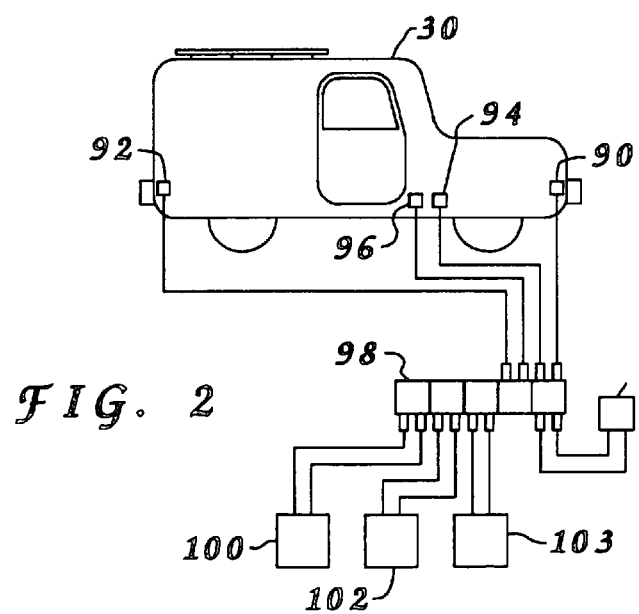
FIG. 2 is a graphical depiction of a collision safety system for an electric vehicle with onboard electricity generation.
Figure 3:
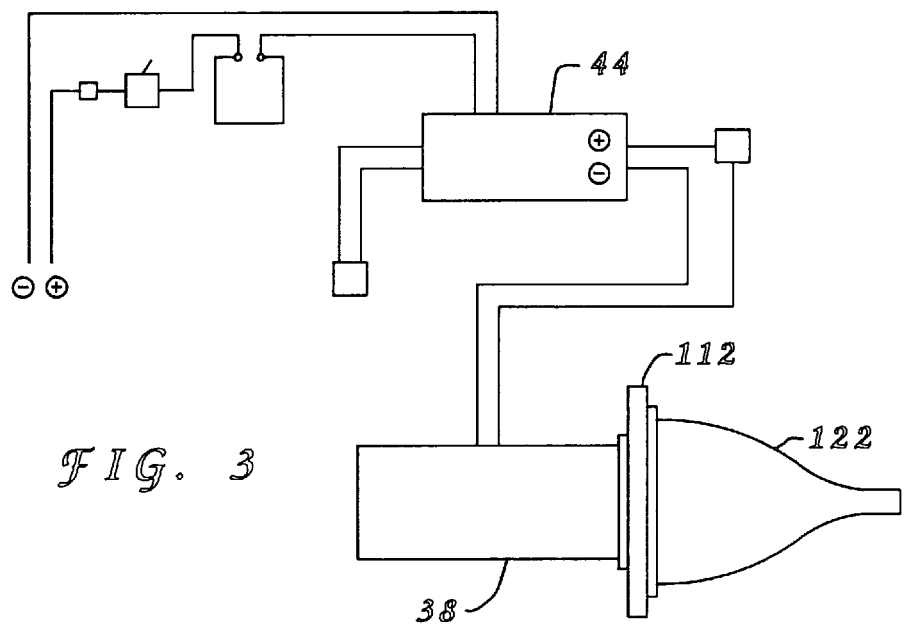
FIG. 3 is a graphical depiction of a drive system for an electric vehicle with onboard electricity generation.
Figure 4:
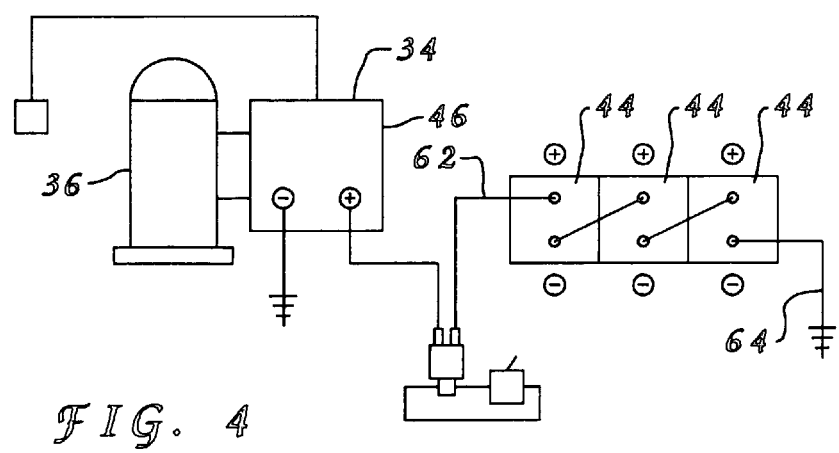
FIG. 4 is a graphical depiction of a drive system for an electric vehicle with onboard electricity generation.
Figure 5:
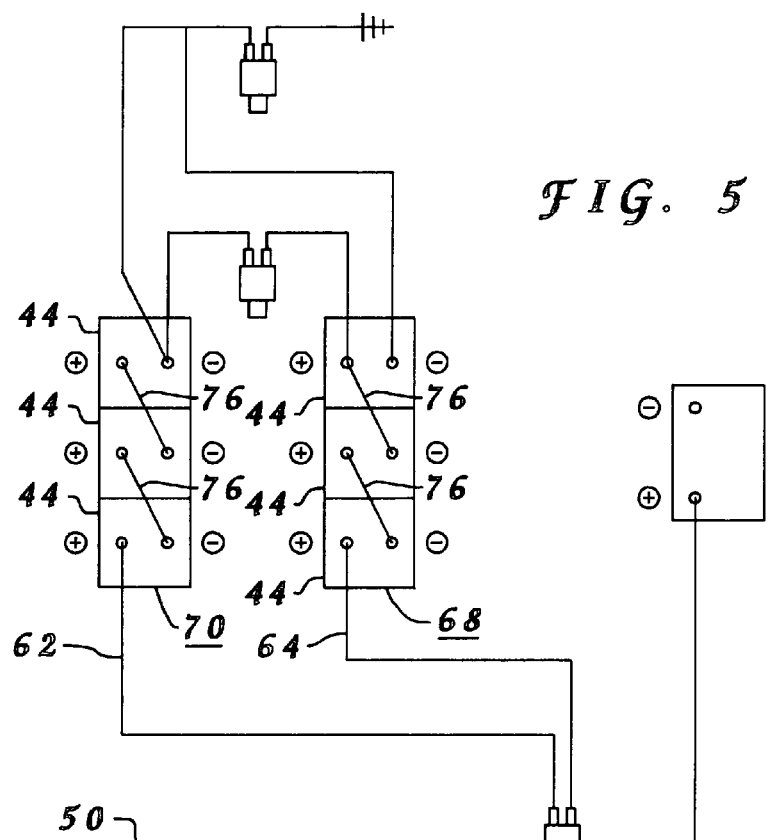
FIG. 5 is a graphical depiction of a battery balancing system.

FIG. 2 depicts electric vehicle 30 having a forward collision sensor 90, a rearward collision sensor 92, a right side collision sensor 94 and a left side collision sensor 96. Collision sensors 90, 92, 94 and 96 are tied into a collision control modular 98 which controls various shutoff controls, depicted in the form of a battery shutoff solenoid 100, a generator shutoff solenoid 102 and an electric motor shutoff solenoid 103. Due to the possibility of loss of signal(s) from the various collision sensors 90, 92, 94 and 96 and collision Control modular 98 and from collision control modular 98 and shutoff solenoids 100, 102 and 103, it is possible to provide features which activate shutoff solenoids 100, 102 and 103 if any of these signals are interrupted.

Conversion Package

Many electric vehicles will be manufactured which fully utilize my invention. A strong market will exist to convert existing vehicles, such as cars, truck, vans and buses, which utilize existing internal combustion engines to utilize my invention. Such conversion will vastly improve the fuel efficiency of the converted vehicles while vastly reducing the pollution produced by these vehicles. Such conversion will also extend the useful life of such vehicles in many cases providing extensive savings to the owner.

During such conversion, the existing internal combustion engine would be removed from the vehicle leaving ample space for installation of the major components of the conversion assembly in that area of the vehicle. Many existing components of the existing vehicle will be retained and utilized following completion of the conversion.

Certain components of the conversion assembly will be specifically designed to mate with existing components of the vehicle to be converted. A transmission adapter will be provided to permit the electric motor of the conversion assembly to be mounted to the existing transmission of the vehicle being converted. Similarly, an exhaust adapter will be provided to permit the small internal combustion engine of the conversion assembly to be mounted to the existing exhaust system of the vehicle being converted. The adapters will mount directly with existing mounts positioned within the vehicle being converted or bridging assemblies will be provided to permit such utilization of the existing mounts. The electricity production unit will mount relative to the small internal combustion engine. An accessory adapter will mount within the compartment, depending upon space requirements, to utilize existing accessory drive units, such as air conditioning, power steering and vacuum pumps, if necessary, while being powered by the rotational output of the small internal combustion engine of the conversion assembly. In certain instances, the existing components will merely be removed and replaced with corresponding components provided with the conversion assembly. Because most occupant compartment heaters utilize heat from the cooling system of the internal combustion engine it will be necessary to provide a dedicated heater component to perform this function. Obviously, the various adapters may be separate units or be configured to be a single unit.

FIG. 1 depicts an example of a conversion package 104 capable of being installed in an existing vehicle 106 to convert existing vehicle 106 to an extremely high efficiency electric vehicle 30. Existing vehicle 106 has an operator position 108 and wheels 110. Conversion package 104 has, as major components, internal combustion engine 36, electricity production unit 34, electric drive motor 38, a transmission adapter 112, an exhaust adapter 114, an accessory adapter 116, a battery pack 118 and wiring harness 120. Internal combustion engine 36 creates a low horsepower rotation to power electricity production unit 34. Electricity production unit 34 creates electricity. Electricity production unit 34 is lightweight and produces high electricity output from the low horsepower rotation provided by internal combustion engine 36. Electric drive motor 38 utilizes the electricity created by electricity production unit 34 to propel electric vehicle 30 using at least one wheel 110 of existing vehicle 106. Battery pack 118 stores electricity for use by electric drive motor 38. Battery pack 118 has a standard electricity delivery method incorporated into wiring harness 120 for withdrawal of electricity from battery pack 118 and a standard electricity acceptance method incorporated into wiring harness 120 for depositing of electricity into battery pack 118. Wiring harness 120 provides for connection of all applicable components of conversion package 104 and applicable components of existing vehicle 106. Wiring harness 120 also provides for operator control of electric vehicle 30 following conversion. Transmission adapter 112, see FIG. 1 and FIG. 3, permit mounting to an existing transmission 122.

FIG. 8 depicts a vacuum pump 124 which creates an abundance of negative pressure within a canister 126 for use by a power brake assembly 128.

Method

Figure 13:
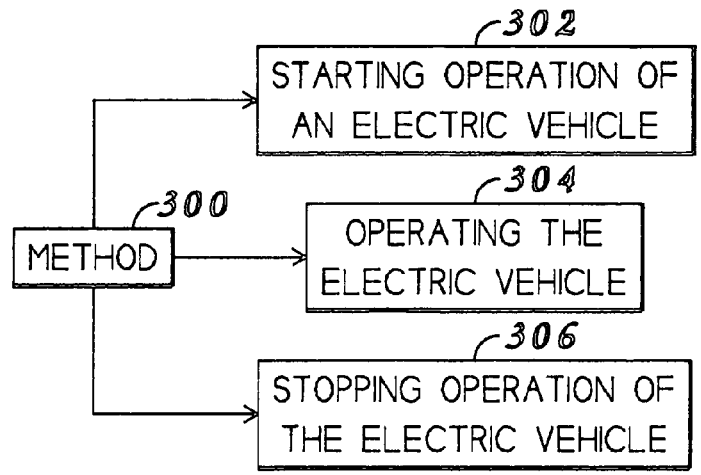

FIG. 13 depicts a 'method' 300 to provide for 'starting operation of an electric vehicle' 302, 'operating the electric vehicle' 304 and 'stopping operation of the electric vehicle' 306.

FIG. 14 depicts 'method' 300 having the steps of 'providing an electric vehicle' 308, 'operating the electric generator/motor unit in the motor mode' 310, 'transferring the electric generator/motor unit' 312 from 'motor mode' 314 to 'generator mode' 316, 'operating the electric vehicle' 318, 'transferring the electric generator/motor unit' 320 from 'generator mode' 316 to 'motor mode' 314 and 'terminating operation of the electric generator/motor unit' 322.

FIG. 15 depicts 'provided electric vehicle' 324 having 'electric generator/motor unit' 326, 'internal combustion engine' 328, 'electric motor' 330 and 'batteries' 332. 'Electric generator/motor unit' 326 operates in 'generator mode' 316 and 'motor mode' 314. 'Generator mode' 316 is capable of producing 'electricity' 334 while 'motor mode' 314 is capable of producing 'rotational force' 336. 'Internal combustion engine' 328 has 'non-operating mode' 342 and 'operating mode' 344. 'Internal combustion engine' 328 is capable of producing 'rotational force' 338 while consuming 'combustible fuel' 340 while in 'operating mode' 344. Rotational force' 338 produced while in 'operating mode' 344 is utilized to turn 'electric generator/motor unit' 326. 'Electric motor' 330 is capable of producing 'rotational force' 346 to 'propel' 348 'provided electric vehicle' 324. 'Batteries' 332 store 'electricity' 334 for use by 'components' 350 of 'provided electric vehicle' 324. 'Electric motor' 330 utilizes 'electricity' 334.

FIG. 16 depicts 'operating the electric generator/motor unit in the motor mode' 310 by 'drawing power from the batteries' 352 to 'turn the motor portion of the electric generator/motor unit' 354 to 'turn the internal combustion engine' 356 to 'transfer the internal combustion engine' 358 from 'non-operating mode' 360 to 'operating mode' 362.

FIG. 17 depicts 'operating the electric vehicle' 304 while 'internal combustion engine operates in operating mode' 364 to 'cause the electric generator/motor unit operating in the generator mode' 366 to 'produce electricity' 368 to 'cause the electric motor' 370 to 'produce rotational force' 372 to 'propel the electric vehicle' 374.

Figure 18:
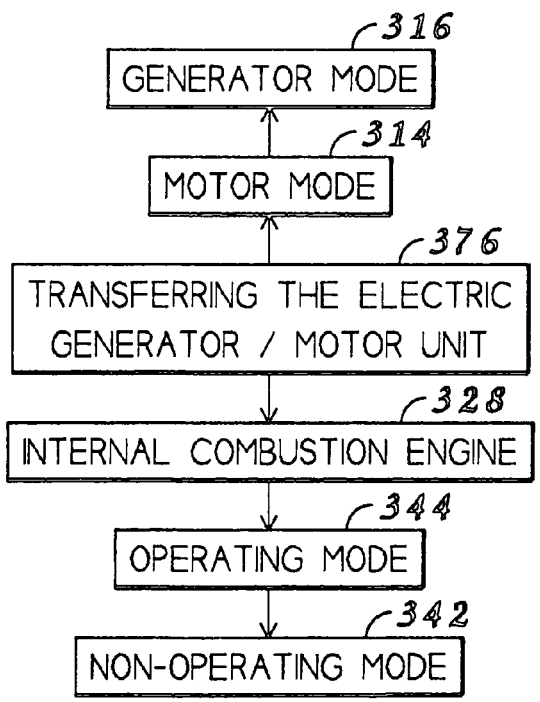

FIG. 18 depicts 'transferring the electric generator/motor unit' 376 from 'motor mode' 314 to 'generator mode' 316 while beginning to transfer 'internal combustion engine' 328 from 'operating mode' 344 to 'non-operating mode' 342.

Figure 19:
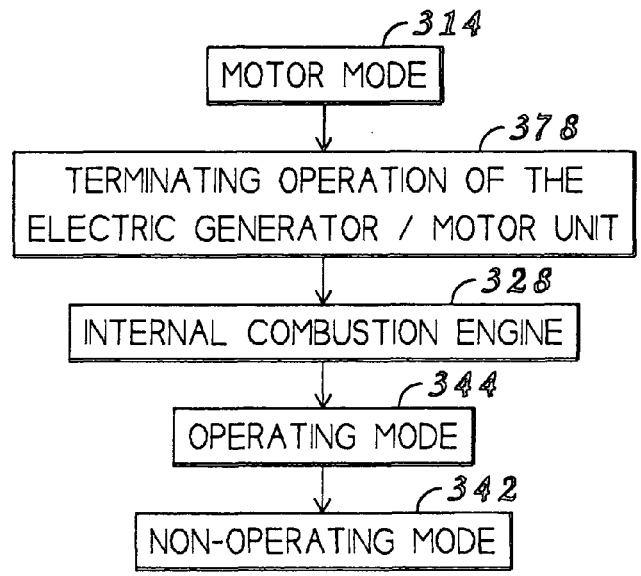

FIG. 19 depicts 'terminating operation of the electric generator/motor unit' 378 from 'motor mode' 314 where 'internal combustion engine' 328 fully transfers from 'operating mode' 344 to 'non-operating mode' 342.

Figure 20:
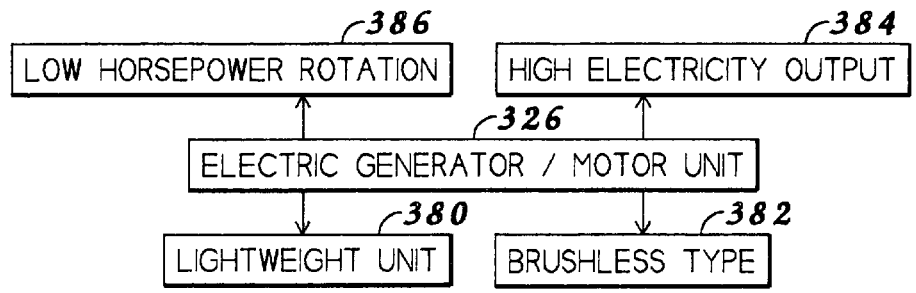

FIG. 20 depicts 'electric generator/motor unit' 326 as 'lightweight unit' 380 of 'brushless type' 382 producing 'high electricity output' 384 at 'low horsepower rotation' 386.

Figure 21:
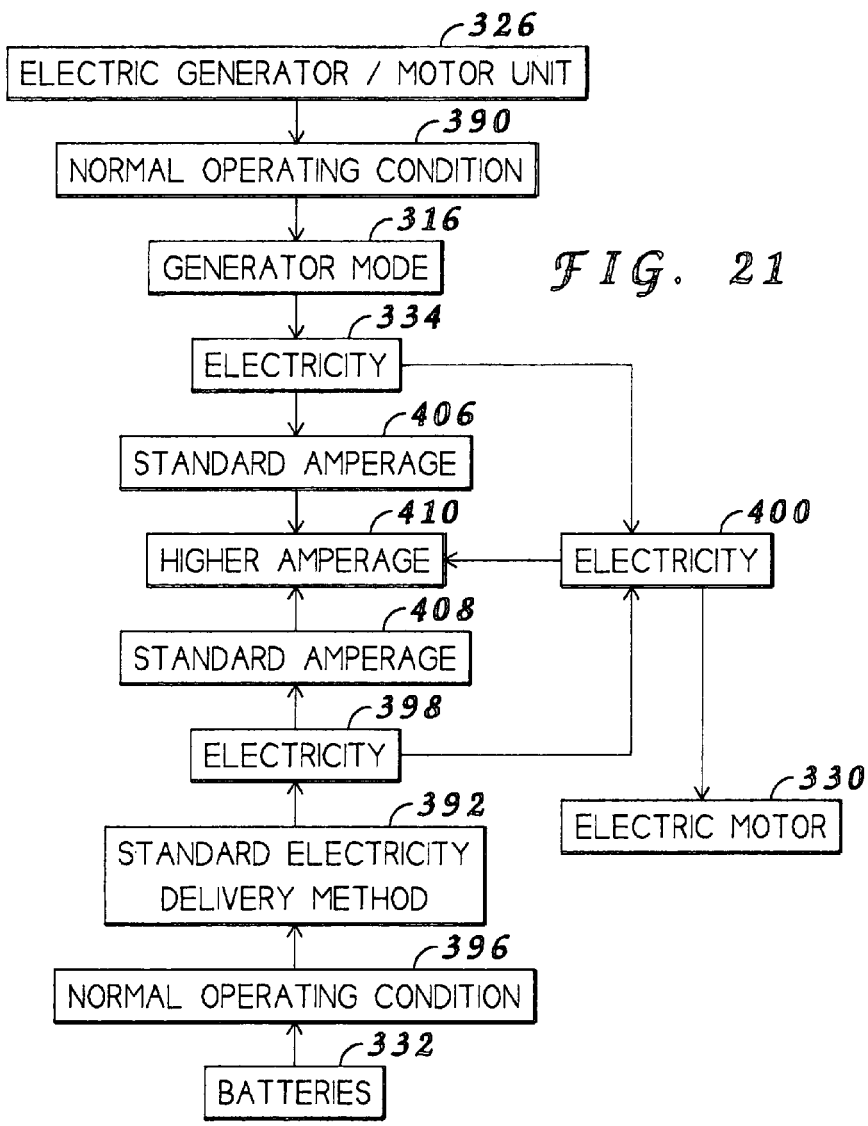

FIG. 21 depicts a combination of 'electricity' 334 and 'electricity' 398 to form 'electricity' 400. 'Electric generator/motor unit' 326 operating in 'generator mode' 316 at 'normal operating condition' 390 produces 'electricity' 334. 'Batteries' 332 at 'normal operating condition' 396 utilizing 'standard electricity delivery method' 392 produce 'electricity' 398. 'Electricity' 334 has a 'standard amperage' 406. 'Electricity' 398 has a 'standard amperage' 408. 'Electricity' 400 has a 'higher amperage' 410 than either 'standard amperage' 406 of 'electricity' 334 or 'standard amperage' 408 of 'electricity' 398. 'Electricity' 400 is provided to 'electric motor' 330.

Figure 22:
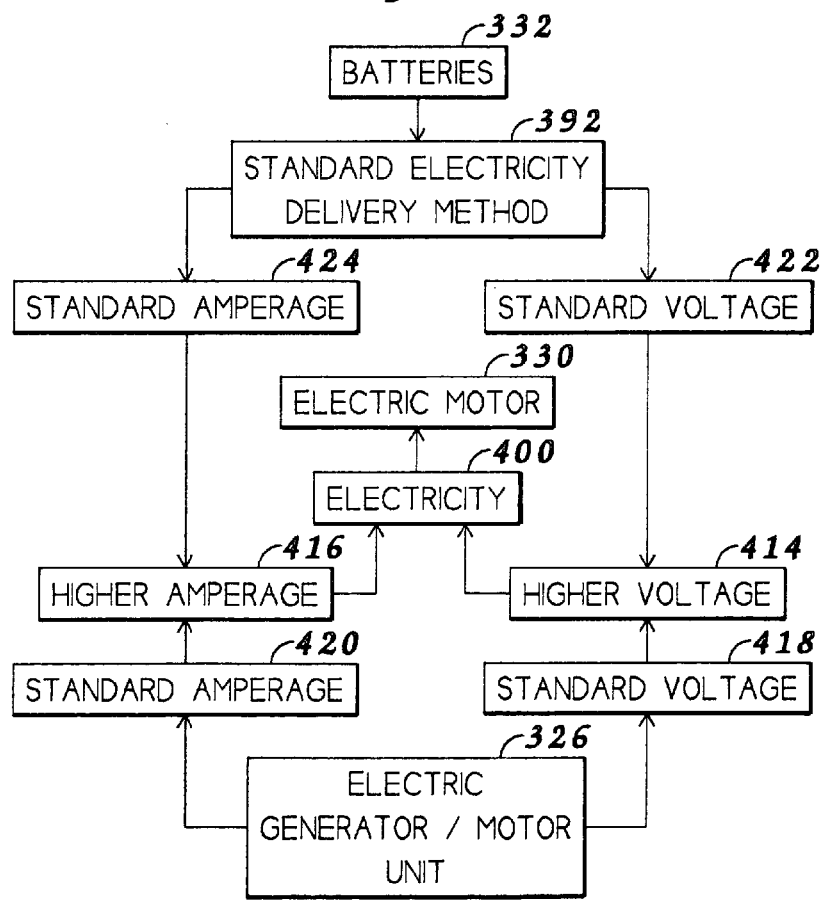

FIG. 22 depicts 'electricity' 400 provided to 'electric motor' 330 having 'higher voltage' 414 and 'higher amperage' 416 than 'standard voltage' 418 and 'standard amperage' 420 of 'electric generator/motor unit' 326 and 'higher voltage' 414 and 'higher amperage' 416 than 'standard voltage' 422 and 'standard amperage' 424 of 'standard electricity delivery method' 392 of 'batteries' 332.

Figure 23:
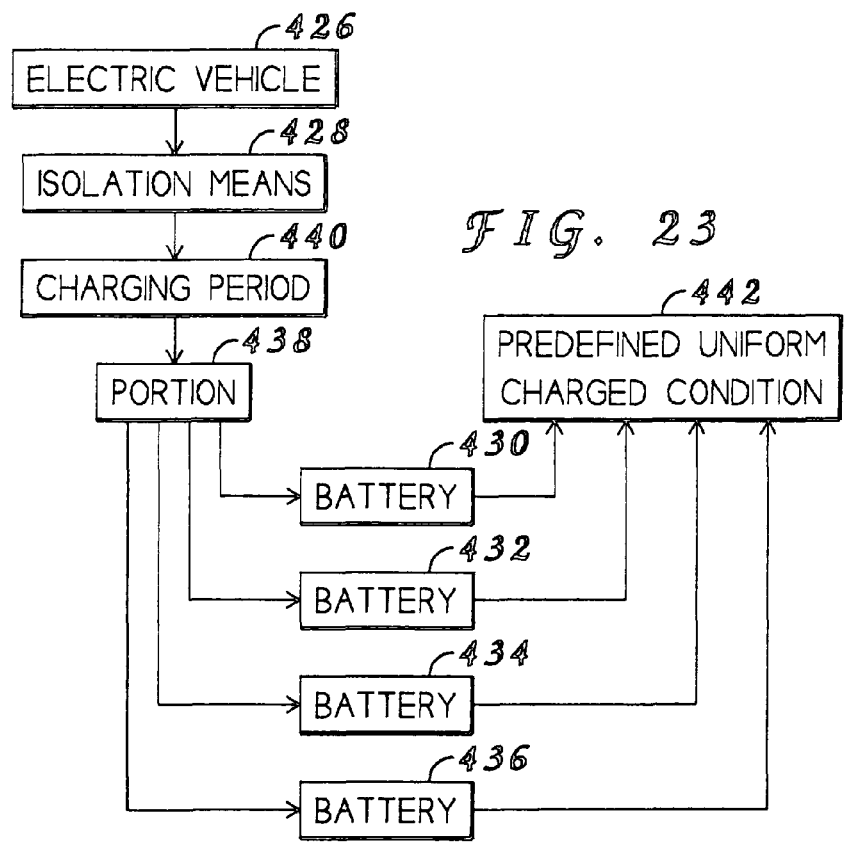

FIG. 23 depicts 'electric vehicle' 426 having 'isolation means' 428 to provide for briefly isolating each 'battery' 430, 432, 434 and 436 during at least a 'portion' 438 of a 'charging period' 440. This provides for each 'battery' 430, 432, 434 and 436 to be returned to a respective 'predefined uniform charged condition' 442.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electric vehicle with onboard electricity production comprising:
   an electricity production unit to generate electricity;
   mechanical means to power the electricity production unit;
   multiple power storage units to store electricity generated by the electricity production unit, wherein continuously each power storage unit is individually cycled through being connected to the electricity production unit for a charging interval in order to receive electricity; and
   an electric motor to propel the electric vehicle, wherein the electric motor receives electricity simultaneously from each of the power storage units to propel the electric vehicle.

2. The electric vehicle with onboard electricity production defined in claim 1, wherein the mechanical means to power the electricity production unit further comprises an internal combustion engine capable of producing low horsepower rotation of the electricity production unit.

3. The electric vehicle with onboard electricity production defined in claim 1, further comprising:
   means to combine the electricity simultaneously received from the multiple power storage units into an enhanced electric current, wherein the enhanced electric current has a voltage which is greater than a voltage of each individual power storage unit and which is greater than a voltage of the electricity generated by the electricity production unit.

4. The electric vehicle with onboard electricity production defined in claim 1, further comprising:
   means to combine the electricity simultaneously received from the multiple power storage units into an enhanced electric current, wherein the enhanced electric current has an amperage which is greater than an amperage of each individual power storage unit and which is greater than an amperage of the electricity generated by the electricity production unit.

5. The electric vehicle with onboard electricity production defined in claim 1, further comprising:
   means to combine the electricity simultaneously received from the multiple power storage units into an enhanced electric current, wherein the enhanced electric current has a voltage and an amperage which are both greater than a voltage and an amperage of each individual power storage unit and which are both greater than a voltage and an amperage of the electricity generated by the electricity production unit.

6. A conversion package to be installed in an existing vehicle chassis to convert the existing vehicle to an extremely high efficiency electric vehicle with onboard electricity production, the conversion package comprising:
   an electricity production unit to create electricity;
   an internal combustion engine to power the electricity production unit;
   multiple power storage units to store electricity generated by the electricity production unit, wherein continuously each power storage unit is individually cycled through being connected to the electricity production unit for a charging interval in order to receive electricity;
   an electric motor to propel the electric vehicle, wherein the electric motor receives electricity simultaneously from each of the power storage units to propel the electric vehicle; and a wiring harness to provide for connection of all applicable components of the conversion package and applicable components of the existing vehicle and to provide operator control of the electric vehicle with onboard electricity production.

7. The conversion package defined in claim 6, further comprising:
means to combine the electricity simultaneously received from the multiple power storage units into an enhanced electric current, wherein the enhanced electric current has a voltage which is greater than a voltage of each individual power storage unit and which is greater than a voltage of the electricity generated by the electricity production unit.

8. The conversion package defined in claim 6, further comprising:
means to combine the electricity simultaneously received from the multiple power storage units into an enhanced electric current, wherein the enhanced electric current has an amperage which is greater than an amperage of each individual power storage unit and which is greater than an amperage of the electricity generated by the electricity production unit.

9. The conversion package defined in claim 6, further comprising:
means to combine the electricity simultaneously received from the multiple power storage units into an enhanced electric current, wherein the enhanced electric current has a voltage and an amperage which are both greater than a voltage and an amperage of each individual power storage unit and which are both greater than a voltage and an amperage of the electricity generated by the electricity production unit.

10. The conversion package defined in claim 6 further, comprising isolation means to provide for briefly isolating each power storage unit during at least a portion of a charging period of a standard electricity acceptance method, thereby returning each power storage unit to a predefined uniform charged condition.

* * * * *